US011971875B2

(12) United States Patent
Nishida et al.

(10) Patent No.: US 11,971,875 B2
(45) Date of Patent: Apr. 30, 2024

(54) FAULT MONITORING METHOD, MONITORING DEVICE, AND RECORDING MEDIUM

(71) Applicant: Panasonic Intellectual Property Corporation of America, Torrance, CA (US)

(72) Inventors: Naohisa Nishida, Osaka (JP); Junichiro Soeda, Nara (JP); Yuji Unagami, Osaka (JP); Junji Michiyama, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 417 days.

(21) Appl. No.: 17/478,289

(22) Filed: Sep. 17, 2021

(65) Prior Publication Data

US 2022/0004543 A1 Jan. 6, 2022

Related U.S. Application Data

(63) Continuation of application No. PCT/JP2020/009308, filed on Mar. 5, 2020.

(Continued)

(51) Int. Cl.
*G06Q 10/02* (2012.01)
*G01R 31/28* (2006.01)
(Continued)

(52) U.S. Cl.
CPC ....... *G06F 16/2379* (2019.01); *G01R 31/282* (2013.01); *H04L 63/08* (2013.01)

(58) Field of Classification Search
CPC .. G06F 16/2379; G01R 31/282; H04L 63/104
See application file for complete search history.

(56) References Cited

U.S. PATENT DOCUMENTS 11,075,917 B2 * 7/2021 Dani .................. H04L 63/104
2012/0221473 A1 * 8/2012 Redmann .......... G06Q 20/3829
705/50

(Continued)

FOREIGN PATENT DOCUMENTS

| JP | 6417467 | 11/2018 |
| JP | 2019-40440 | 3/2019 |
| JP | 2019-101615 | 6/2019 |

OTHER PUBLICATIONS

International Search Report (ISR) dated Jun. 2, 2020 in International (PCT) Application No. PCT/JP2020/009308.

(Continued)

*Primary Examiner* — Lam S Nguyen
(74) *Attorney, Agent, or Firm* — Wenderoth, Lind & Ponack, L.L.P.

(57) ABSTRACT

A fault monitoring method is executed by a monitoring device in a fault monitoring system that includes a terminal used by a user, an appliance to be operated by the user, the monitoring device, and a plurality of authentication servers each including a distributed ledger, and includes: obtaining event information stored in the plurality of authentication servers and indicating an event generated in response to a request that includes a processing instruction for the user operating the appliance; obtaining state information indicating whether the appliance is faulty, from the appliance; generating first transaction data including the state information obtained and transmitting the first transaction data to the plurality of authentication servers; and transmitting the processing instruction included in the event information to the appliance, when the appliance is determined to be not faulty from the state information.

8 Claims, 15 Drawing Sheets

Related U.S. Application Data

(60) Provisional application No. 62/826,157, filed on Mar. 29, 2019.

(51) Int. Cl.
*G06F 16/23* (2019.01)
*H04L 9/40* (2022.01)

(56) References Cited

U.S. PATENT DOCUMENTS

2018/0176228 A1 6/2018 He et al.
2019/0317677 A1* 10/2019 Tanaka ................ G06F 16/2365

OTHER PUBLICATIONS

GMO Internet, Inc., "GMO Internet Group, Saison Information Systems Co., Ltd., and Parco Co., Ltd. have jointly conducted the second field trial utilizing blockcahin and IoT" [online], Jun. 21, 2017, [retrieved Oct. 25, 2018], Internet <URL:https://cloud.z.com/jp/news-ep/IoT2/> with partial English translation.

Extended European Search Report dated Apr. 4, 2022 in corresponding European Patent Application No. 20782062.2.

\* cited by examiner

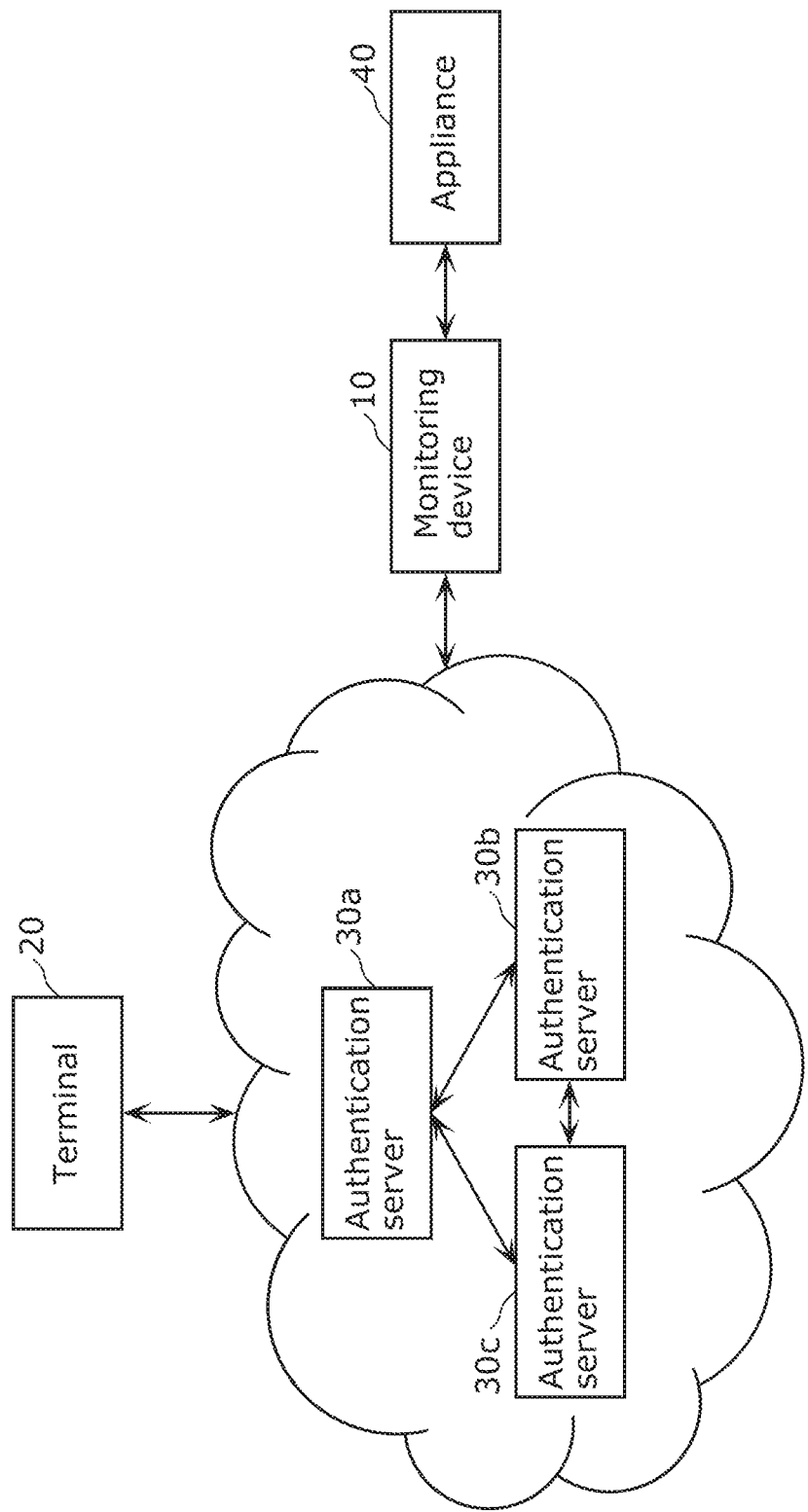

FIG. 4A

{Processing instruction: "Turn on", Object appliance: "Lighting 1"}

FIG. 4B

{Processing instruction: "Unlock", Object appliance: "Entrance door 1"}

FIG. 4C

{Processing instruction: "Turn on", Object appliance: "Lighting 1", "Lighting 2", "Lighting 5"}

FIG. 4D

{Processing instruction: "Turn on", Object appliance: "Lighting 1", Signature}

FIG. 4E

{Processing instruction: "Turn on", Object appliance: "Lighting 1", Issuance date and time: "2019/12/1 15:30"}

FIG. 4F

{Processing instruction: "Turn on", Object appliance: "Lighting 1", Processing date and time: "2019/12/10 17:00"}

{Fault status: "Faulty", Object appliance: "Lighting 1", Determination date and time: "2019/12/1 17:30"}

{Fault status: "Normal", Object appliance: "Lighting 1", Determination date and time: "2019/12/1 17:30"}

FAULT MONITORING METHOD, MONITORING DEVICE, AND RECORDING MEDIUM

CROSS REFERENCE TO RELATED APPLICATIONS

This is a continuation application of PCT International Application No. PCT/JP2020/009308 filed on Mar. 5, 2020, designating the United States of America, which is based on and claims priority of U.S. Provisional Patent Application No. 62/826,157 filed on Mar. 29, 2019. The entire disclosures of the above-identified applications, including the specifications, drawings and claims are incorporated herein by reference in their entirety.

FIELD

The present disclosure relates to a fault monitoring method, a monitoring device, and a recording medium, and particularly to a fault monitoring method, a monitoring device, and a recording medium using a distributed ledger.

BACKGROUND

Various companies propose services using blockchains in recent years. An example of services using blockchains is a service of managing locking and unlocking of a unit constituting each delivery locker using a blockchain (see Non Patent Literature (NPL) 1).

Another example of services using blockchains is a service of installing an electronic lock in each hotel room and managing entering and leaving the room using a blockchain.

CITATION LIST

Non Patent Literature

NPL 1: GMO Internet, Inc., "GMO Internet Group, Saison Information Systems Co., Ltd., and Parco Co., Ltd. have jointly conducted the second field trial utilizing blockchain and IoT" [online], Jun. 21, 2017, [retrieved Oct. 25, 2018], Internet <URL:https://cloud.z.com/jp/news-ep/IoT2/>.

SUMMARY

Technical Problem

With these services, however, in the case where an electronic lock installed in an IoT (Internet of Things) device such as a delivery locker or a room is faulty, operation such as unlocking the electronic lock can be performed on the blockchain, but the operation cannot be actually performed. In detail, there is a problem in that whether the IoT device is actually usable is unknown until the user moves to the actual position of the IoT device and performs the operation on the blockchain. In such a case, not only the time and energy spent on moving to the actual position of the IoT device are wasted, but also the reliability of the service using the blockchain cannot be ensured. This causes the IoT device to remain unused. There is thus demand for a technique of, before actually using the IoT device, detecting whether the electronic lock is faulty and, in the case where the electronic lock is faulty, prohibiting the use of the IoT device (hereafter also referred to as "appliance").

In view of such circumstances, the present disclosure provides a fault monitoring method, etc. that can suppress use of a faulty appliance using a distributed ledger.

Solution to Problem

To solve the problem stated above, a fault monitoring method according to one aspect of the present disclosure is a fault monitoring method executed by a monitoring device in a fault monitoring system which includes a terminal used by a user, an appliance to be operated by the user, the monitoring device, and a plurality of authentication servers each including a distributed ledger and in which the terminal, the monitoring device, and the plurality of authentication servers are capable of communicating with one another via a network, the fault monitoring method including: obtaining, from a first authentication server among the plurality of authentication servers, event information stored in the plurality of authentication servers, the event information indicating an event generated in response to a request that is generated by the user via the terminal and transmitted from the terminal to the first authentication server and includes a processing instruction for the user operating the appliance; obtaining state information indicating whether the appliance is faulty, from the appliance; generating first transaction data including the state information obtained and transmitting the first transaction data to the first authentication server, to record the first transaction data in the distributed ledger in each of the plurality of authentication servers; and transmitting the processing instruction included in the event information to the appliance, when the appliance is determined to be not faulty from the state information.

These general and specific aspects may be implemented using a system, an integrated circuit, a computer program, or a computer-readable recording medium such as CD-ROM, or any combination of a system, a method, an integrated circuit, a computer program, and a recording medium.

Advantageous Effects

According to the present disclosure, a fault monitoring method, etc. that can suppress use of a faulty appliance using a distributed ledger can be provided.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1 is a diagram illustrating an example of the overall structure of a fault monitoring system according to an embodiment.

FIG. 4A is a diagram illustrating an example of a processing instruction, etc. included in transaction data generated by a transaction data generator according to the embodiment.

FIG. 4B is a diagram illustrating an example of a processing instruction, etc. included in transaction data generated by the transaction data generator according to the embodiment.

FIG. 4C is a diagram illustrating an example of a processing instruction, etc. included in transaction data generated by the transaction data generator according to the embodiment.

FIG. 4D is a diagram illustrating an example of a processing instruction, etc. included in transaction data generated by the transaction data generator according to the embodiment.

FIG. 4E is a diagram illustrating an example of a processing instruction, etc. included in transaction data generated by the transaction data generator according to the embodiment.

FIG. 4F is a diagram illustrating an example of a processing instruction, etc. included in transaction data generated by the transaction data generator according to the embodiment.

Figure 2A:
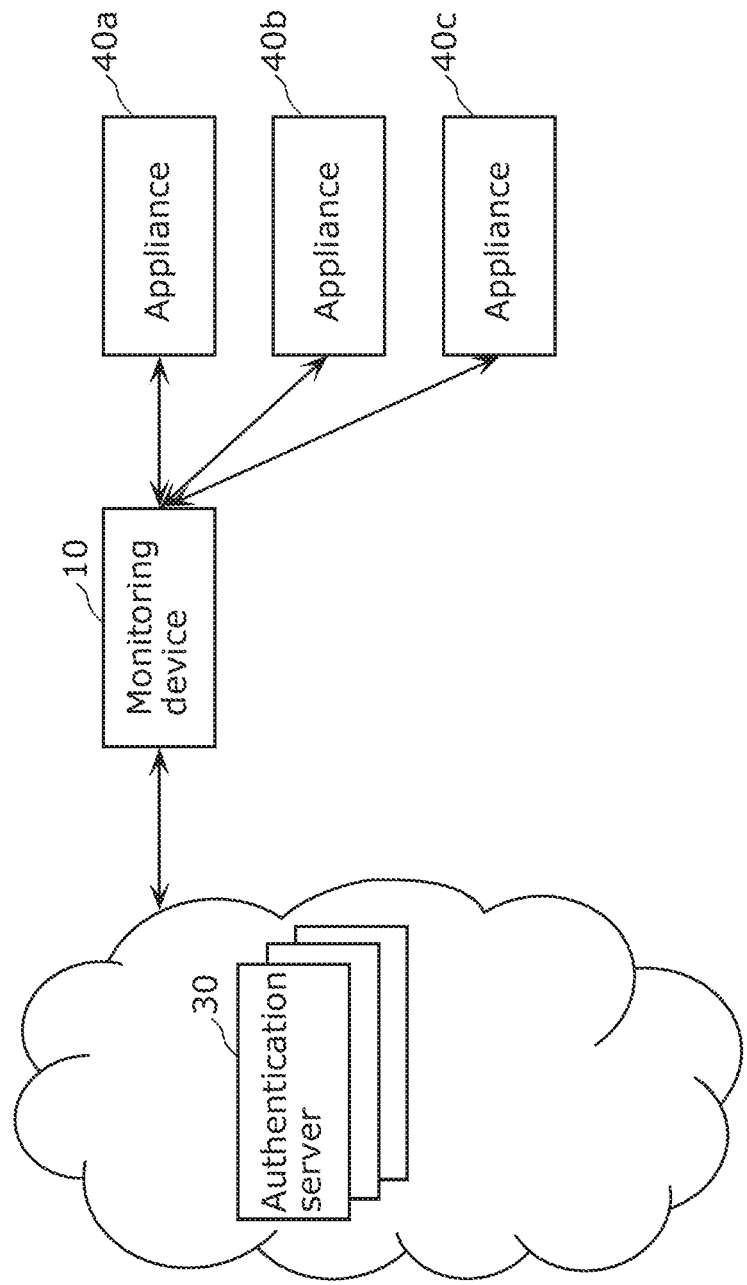
FIG. 2A is a diagram illustrating another example of a monitoring device and an appliance included in the fault monitoring system illustrated in FIG. 1.

DESCRIPTION OF EMBODIMENTS (Underlying Knowledge Forming Basis of the Present Disclosure)

Take, for example, a service of installing an electronic lock in each hotel room and managing entering and leaving the room using a blockchain (distributed ledger). In the case where such a service is provided, a user can book a room beforehand using the blockchain. When the user arrives at the hotel and holds an IC card or the like over an electronic lock installed in the room, whether the user is allowed to enter and leave the room is verified by determining whether the user has the right to unlock the electronic lock on the distributed ledger. In the case where the user has the right to unlock the electronic lock, the electronic lock is unlocked. In this way, any unauthorized user is prohibited from tampering with authority or stealing and using an electronic key.

However, there is a problem in that, in the case where the electronic lock installed in the room is faulty, the room, i.e. the appliance, is actually not usable even though operation such as booking and unlocking the room can be performed on the distributed ledger, as mentioned above.

In view of this, the present disclosure proposes a technique of, before an appliance is actually used, detecting whether the appliance is faulty and, in the case where the appliance is faulty, prohibiting the use of the appliance. In other words, the present disclosure provides a fault monitoring method, etc. that can suppress use of a faulty appliance using a distributed ledger.

A fault monitoring method according to an aspect of the present disclosure is a fault monitoring method executed by a monitoring device in a fault monitoring system which includes a terminal used by a user, an appliance to be operated by the user, the monitoring device, and a plurality of authentication servers each including a distributed ledger and in which the terminal, the monitoring device, and the plurality of authentication servers are capable of communicating with one another via a network, the fault monitoring method including: obtaining, from a first authentication server among the plurality of authentication servers, event information stored in the plurality of authentication servers, the event information indicating an event generated in response to a request that is generated by the user via the terminal and transmitted from the terminal to the first authentication server and includes a processing instruction for the user operating the appliance; obtaining state information indicating whether the appliance is faulty, from the appliance; generating first transaction data including the state information obtained and transmitting the first transaction data to the first authentication server, to record the first transaction data in the distributed ledger in each of the plurality of authentication servers; and transmitting the processing instruction included in the event information to the appliance, when the appliance is determined to be not faulty from the state information.

In this way, use of a faulty appliance can be suppressed using a distributed ledger. More specifically, whether the appliance to be operated by the user is faulty is monitored by the monitoring device, and state information indicating whether the appliance is faulty is managed in the distributed ledger. Thus, not only the state information of the appliance can be protected from tampering but also the use of a faulty appliance can be suppressed.

Moreover, since the appliance that can be operated using the blockchain can be regarded as an appliance that is actually usable, it is possible to avoid a situation in which whether the appliance is actually usable is unknown until the user moves to the position of the appliance. Hence, the time and energy spent on moving to the position of the appliance that is faulty and cannot be operated are saved without being wasted. In addition, the reliability of the service using the blockchain can be ensured.

For example, the request may further include a transfer request to transfer authority over the appliance for causing the appliance to execute the processing instruction, the event information may further include information indicating that the transfer request to transfer the authority over the appliance has been made, and the fault monitoring method may further include, after obtaining the state information: generating second transaction data indicating approval to the transfer request and transmitting the second transaction data to the first authentication server, when the appliance is determined to be not faulty from the state information; and generating third transaction data indicating rejection of the transfer request and transmitting the third transaction data to the first authentication server, when the appliance is determined to be faulty from the state information.

For example, the request may further include transfer of authority over the appliance for causing the appliance to execute the processing instruction, the event information may further include information indicating that the transfer of the authority over the appliance has been made, and the fault monitoring method may further include, after obtaining the state information: generating fourth transaction data indicating return of the transfer and transmitting the fourth transaction data to the first authentication server, when the appliance is determined to be faulty from the state information.

For example, the fault monitoring method may include: generating the first transaction data and recording a block including the first transaction data generated in the distributed ledger.

For example, the fault monitoring method may include: generating the first transaction data including the state information and recording the first transaction data generated in the distributed ledger, only when the appliance is determined to be faulty from the state information.

For example, the fault monitoring method may further include: recording fifth transaction data indicating the request including the processing instruction, in the distributed ledger in the first authentication server.

A monitoring device according to an aspect of the present disclosure is a monitoring device in a fault monitoring system which includes a terminal used by a user, an appliance to be operated by the user, the monitoring device, and a plurality of authentication servers each including a distributed ledger and in which the terminal, the monitoring device, and the plurality of authentication servers are capable of communicating with one another via a network, the monitoring device including: an event information monitor that obtains, from a first authentication server among the plurality of authentication servers, event information stored in the plurality of authentication servers, the event information indicating an event generated in response to a request that is generated by the user via the terminal and transmitted from the terminal to the first authentication server and includes a processing instruction for the user operating the appliance; a fault determiner that obtains state information indicating whether the appliance is faulty from the appliance, generates first transaction data including the state information obtained, and transmits the first transaction data to the first authentication server, to record the first transaction data in the distributed ledger in each of the plurality of authentication servers; and a processing instruction requester that transmits the processing instruction included in the event information to the appliance, when the appliance is determined to be not faulty from the state information.

Embodiments will be described below, with reference to the drawings. The embodiments described below each show a specific example according to the present disclosure. The numerical values, shapes, structural elements, steps, the order of steps, etc. shown in the following embodiments are mere examples, and do not limit the scope of the present disclosure. Of the structural elements in the embodiments described below, the structural elements not recited in any one of the independent claims representing the broadest concepts are described as optional structural elements. Each drawing does not necessarily provide precise depiction. The substantially same structural elements are given the same reference marks throughout the drawings, and repeated description may be omitted or simplified.

Various modifications to the embodiments conceived by a person skilled in the art and other embodiments formed by combining structural elements in the embodiments without departing from the gist of the present disclosure are also included in the scope of the present disclosure.

[Embodiment]

A fault monitoring system according to the present disclosure will be described below.

[1. Fault Monitoring System]

The fault monitoring system according to the present disclosure includes a terminal used by a user, an appliance to be operated by the user, a monitoring device, and a plurality of authentication servers each including a distributed ledger. The fault monitoring system according to the present disclosure can manage, using the distributed ledger (blockchain), state information indicating whether the appliance to be operated by the user is faulty, and stop the use in the case where the appliance is faulty.

A fault monitoring system, etc. according to an embodiment will be described below, with reference to the drawings.

[1.1 Overall Structure of Fault Monitoring System]

FIG. 1 is a diagram illustrating an example of the overall structure of a fault monitoring system according to Embodiment 1. The fault monitoring system illustrated in FIG. 1 includes terminal 20, three authentication servers 30a, 30b, and 30c as an example, monitoring device 10, and appliance 40. These structural elements are connected via a network such as wired internet, wireless communication, or dedicated communication. Such communication may be not real-time communication. For example, terminal 20 may collect transaction data to a certain extent and then transmit the transaction data to the plurality of authentication servers 30a, 30b, and 30c at once.

Figure 2B:
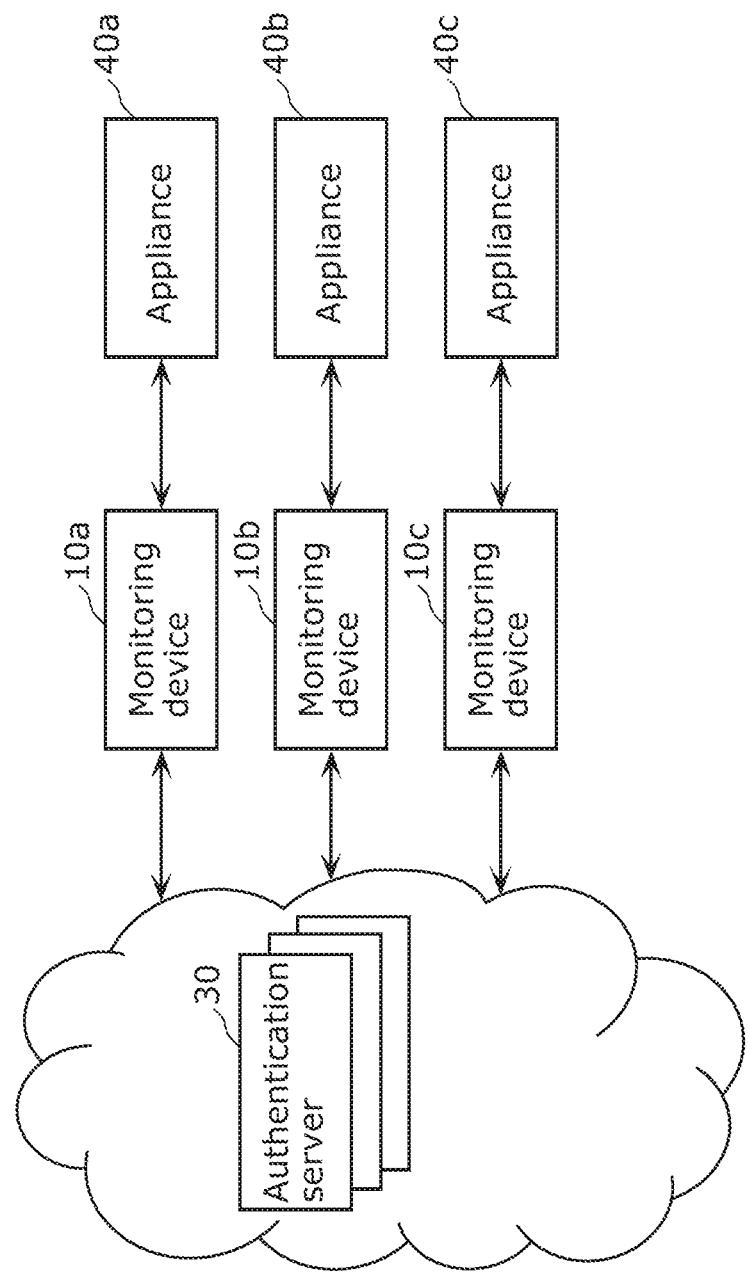
FIG. 2B is a diagram illustrating another example of the monitoring device and the appliance included in the fault monitoring system illustrated in FIG. 1.
Figure 2C:
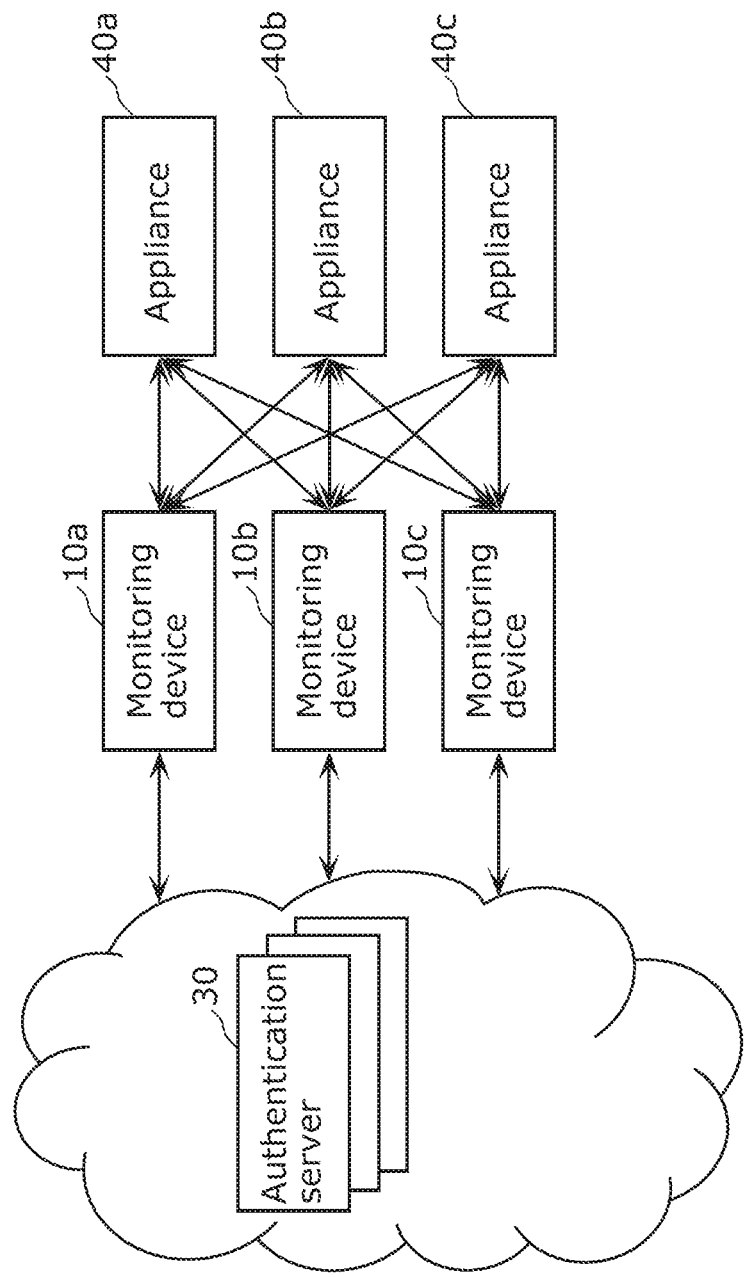
FIG. 2C is a diagram illustrating another example of the monitoring device and the appliance included in the fault monitoring system illustrated in FIG. 1.

Although FIG. 1 illustrates an example in which one monitoring device 10 performs fault monitoring on one appliance 40 in the fault monitoring system, the presently disclosed technique is not limited to such. FIG. 2A to FIG. 2C are each a diagram illustrating another example of a monitoring device and an appliance included in the fault monitoring system illustrated in FIG. 1. In detail, one monitoring device 10 may monitor one or more appliances 40 such as appliances 40a, 40b, and 40c, as illustrated in FIG. 2A. The number of appliances 40 and the number of monitoring devices 10 may each be more than one as long as the numbers are the same, as illustrated in FIG. 2B. More specifically, the fault monitoring system may include a plurality of monitoring devices 10 such as monitoring devices 10a, 10b, and 10c and one or more appliances 40 such as appliances 40a, 40b, and 40c, where one monitoring device 10 performs fault monitoring on one appliance 40. Alternatively, the fault monitoring system may include a plurality of appliances 40 and a plurality of monitoring devices 10 where one or more monitoring devices 10 monitor one appliance 40, as illustrated in FIG. 2C.

Although FIG. 1 illustrates an example in which the fault monitoring system includes one terminal 20 and three authentication servers 30, the presently disclosed technique is not limited to such. The fault monitoring system may include two or more terminals 20. The fault monitoring system includes one or more authentication servers 30.

[1.2 Terminal]

Figure 3:
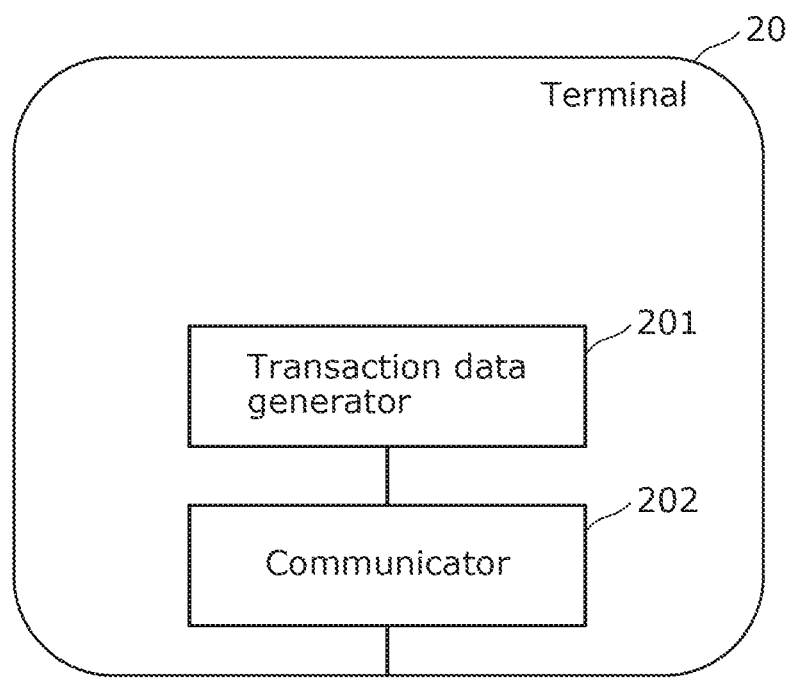
FIG. 3 is a diagram illustrating an example of the structure of a terminal according to the embodiment.

FIG. 3 is a diagram illustrating an example of the structure of terminal 20 according to this embodiment. As illustrated in FIG. 3, terminal 20 includes transaction data generator 201 and communicator 202. Terminal 20 is, for example, implemented in a computer or a mobile terminal including a processor (microprocessor), a memory, a communication interface, and the like. Terminal 20 includes an interface for receiving input from the user. For example, in the case where appliance 40 is a door of a room, the interface may be a button for opening the door. In the case where appliance 40 is a lighting, the interface may be a button for turning on the lighting.

[1.2.1 Transaction Data Generator]

Transaction data generator 201 generates transaction data including appliance 40 selected through input by the user as an operation object and a processing instruction requested by the user. For example, in the case where the button for opening the door or the button for turning on the lighting is pressed by the user, transaction data generator 201 generates transaction data including a processing instruction to open the door or turn on the lighting.

Transaction data generator 201 transmits the generated transaction data to communicator 202.

Examples of transaction data generated by transaction data generator 201 will be described below, with reference to FIG. 4A to FIG. 4F.

FIG. 4A to FIG. 4F are each a diagram illustrating an example of a processing instruction, etc. included in transaction data generated by transaction data generator 201 according to this embodiment.

FIG. 4A and FIG. 4B each illustrate an example of transaction data including an appliance of an operation object (referred to as "object appliance") selected through input by the user and a processing instruction requested by the user. More specifically, FIG. 4A illustrates transaction data indicating that the object appliance is lighting 1 and the processing instruction is to turn on. FIG. 4B illustrates transaction data indicating that the object appliance is entrance door 1 and the processing instruction is to unlock. In the case where the processing instruction is obvious and need not be designated, the transaction data may include only the object appliance. In the case where the same processing instruction is requested for a plurality of appliances, the same number of items of transaction data illustrated in FIG. 4A or FIG. 4B as the number of object appliances may be generated. Alternatively, the plurality of object appliances may be included in one item of transaction data, as illustrated in FIG. 4C as an example. FIG. 4C illustrates transaction data indicating that the object appliances are lighting 1, lighting 2, and lighting 3 and the processing instruction is to turn on.

Moreover, the creator's signature may be added as compared with FIG. 4A, as illustrated in FIG. 4D. This enables determination of whether the creator of the transaction data and the user who wants to operate the object appliance are the same. The issuance date and time of the transaction data may be added as illustrated in FIG. 4E, as compared with FIG. 4A. This prevents the execution order of a plurality of processing instructions for the object appliance from being changed. The date and time at which the processing instruction is to be executed, namely, the processing date and time, may be designated as illustrated in FIG. 4F, as compared with FIG. 4A.

[1.2.2 Communicator]

Communicator 202 communicates with authentication servers 30a, 30b, and 30c via the network. In this embodiment, communicator 202 transmits the transaction data generated by transaction data generator 201 to authentication servers 30a, 30b, and 30c.

Thus, terminal 20 receives input from the user, creates a request including a processing instruction for the user operating appliance 40, and transmits the request to at least one authentication server (for example, a first authentication server) among the plurality of authentication servers 30. In this embodiment, terminal 20 generates transaction data including the created request, and transmits the transaction data to authentication servers 30a, 30b, and 30c.

In the case where there are a plurality of appliances 40 that can be operated by the user, appliance 40 of an operation object may be selected from the plurality of appliances 40 through input by the user.

Figure 5:
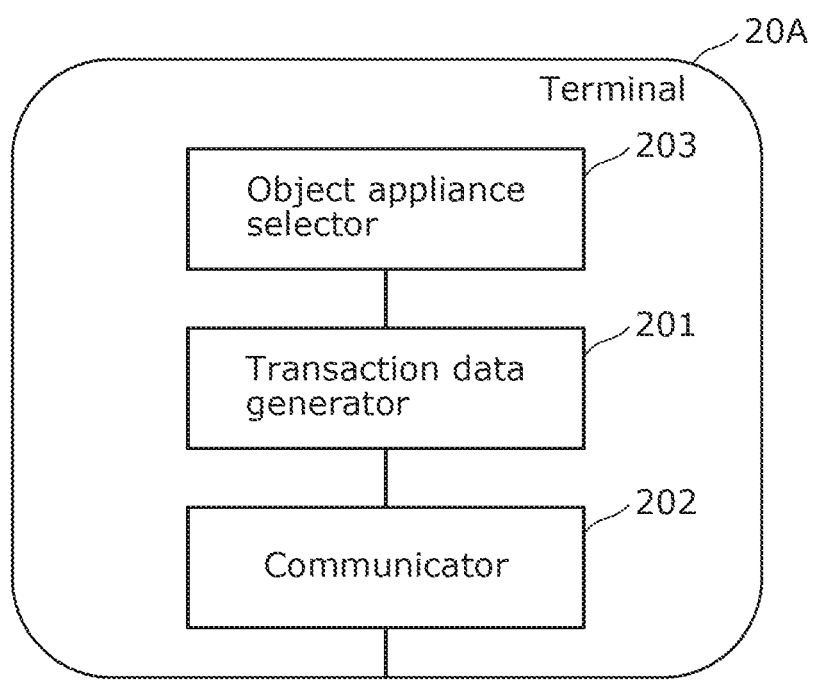
FIG. 5 is a diagram illustrating another example of the structure of the terminal according to the embodiment.

FIG. 5 is a diagram illustrating an example of the structure of terminal 20A according to this embodiment. The same elements as in FIG. 3 are given the same reference signs, and their detailed description is omitted. Terminal 20A illustrated in FIG. 5 has a structure in the case where there are a plurality of appliances 40 that can be operated by the user, and further includes object appliance selector 203 as compared with terminal 20 illustrated in FIG. 3. Object appliance selector 203 selects appliance 40 of an operation object from the plurality of appliances 40 through input by the user. Object appliance selector 203 also selects a processing instruction for appliance 40 selected through input by the user. Object appliance selector 203 transmits selected appliance 40 and the selected processing instruction to transaction data generator 201.

[1.3 Authentication Server]

Authentication servers 30a, 30b, and 30c illustrated in FIG. 1 are, for example, cloud servers. Authentication servers 30a, 30b, and 30c have the same structure, and accordingly the structure of authentication server 30 as a representative example will be described below. Authentication server 30 includes a distributed ledger (not illustrated). Any of authentication servers 30a, 30b, and 30c is an example of a first server.

Figure 6:
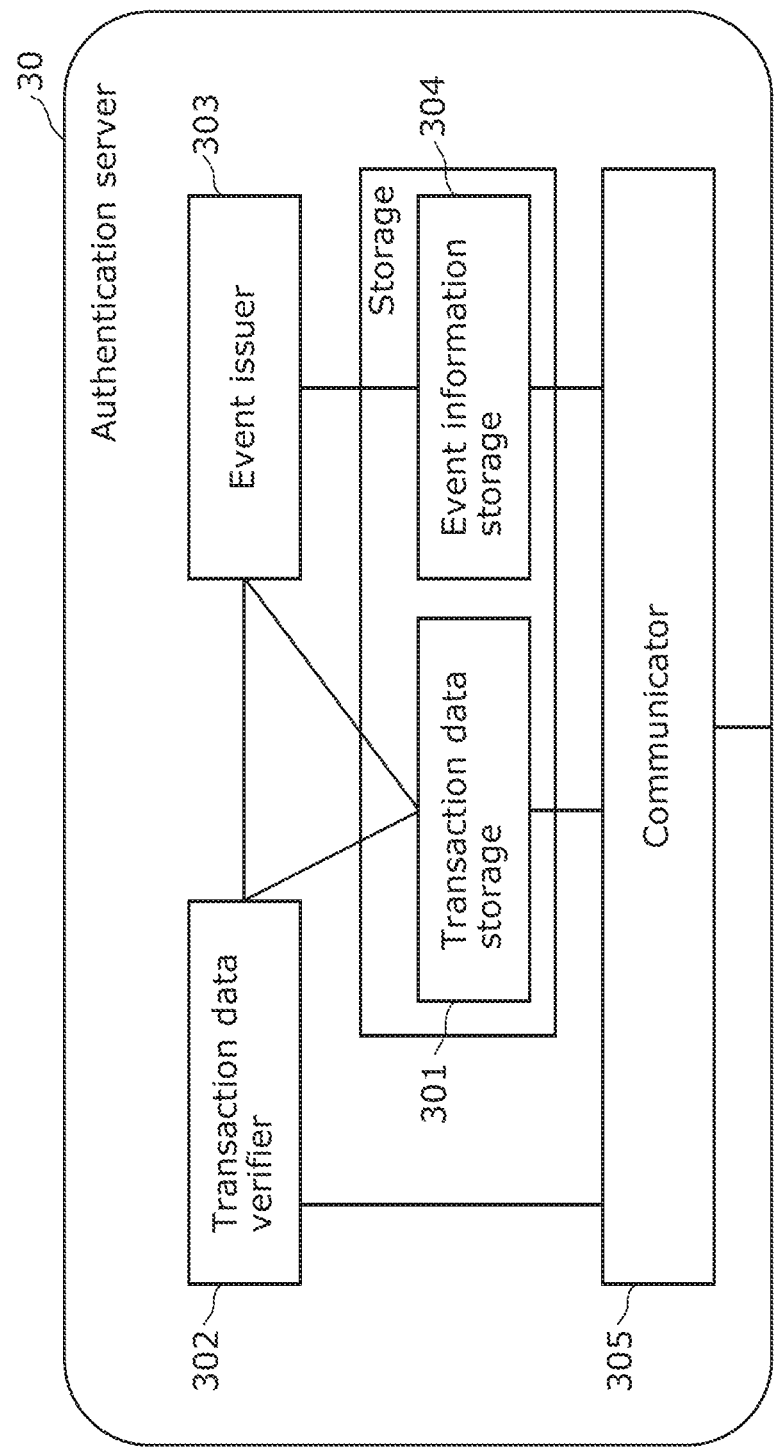
FIG. 6 is a diagram illustrating an example of the structure of an authentication server according to the embodiment.

FIG. 6 is a diagram illustrating an example of the structure of authentication server 30 according to this embodiment. Authentication server 30 includes transaction data storage 301, transaction data verifier 302, event issuer 303, event information storage 304, and communicator 305. Transaction data verifier 302 is optional. Authentication server 30 can be implemented as a result of a processor executing a predetermined program using a memory. Each of the structural elements will be described below.

[1.3.1 Transaction Data Storage]

Transaction data storage 301 stores transaction data received from terminal 20 or monitoring device 10. Transaction data storage 301 may include a region for temporarily storing transaction data and a region functioning as a distributed ledger. In this case, transaction data storage 301 records (stores) transaction data received from terminal 20 or monitoring device 10, as a distributed ledger.

[1.3.2 Transaction Data Verifier]

Transaction data verifier 302 verifies the validity of transaction data transmitted from terminal 20 or monitoring device 10. Specifically, for example, transaction data verifier 302 verifies whether the transaction data includes a cryptographic signature generated by a correct method, or whether the processing instruction included in the transaction data is meaningful. In the case where transaction data verifier 302 verifies that the transaction data is valid, transaction data verifier 302 transmits the transaction data to event issuer 303, to issue an event.

[1.3.3 Event Issuer]

Event issuer 303 issues an event relating to the transaction data that is verified as valid by transaction data verifier 302. The event is generated in response to the request that is generated by the user via terminal 20 and includes the processing instruction for the user operating appliance 40. In this embodiment, the event includes information such as the processing instruction and the object appliance included in the transaction data. The event may include the transaction data.

Event issuer 303 transmits the issued event to event information storage 304.

[1.3.4 Event Information Storage]

Event information storage 304 stores the event issued by event issuer 303, as event information. In the case where an inquiry or a request for event information is made from monitoring device 10, event information storage 304 transmits the event information to monitoring device 10.

[1.3.5 Communicator]

Communicator 305 communicates with terminal 20, other authentication servers 30, and monitoring device 10 via the network. In this embodiment, communicator 305 stores the transaction data transmitted from terminal 20 or monitoring device 10 in transaction data storage 301. Communicator 305 also transfers the transaction data transmitted from transaction data verifier 302, to other authentication servers 30. In the case where a request or an inquiry for event information is made from monitoring device 10, communicator 305 receives the event information from event information storage 304 and transmits the event information to monitoring device 10.

[1.4 Monitoring Device]

Monitoring device 10 will be described below.

Figure 7:
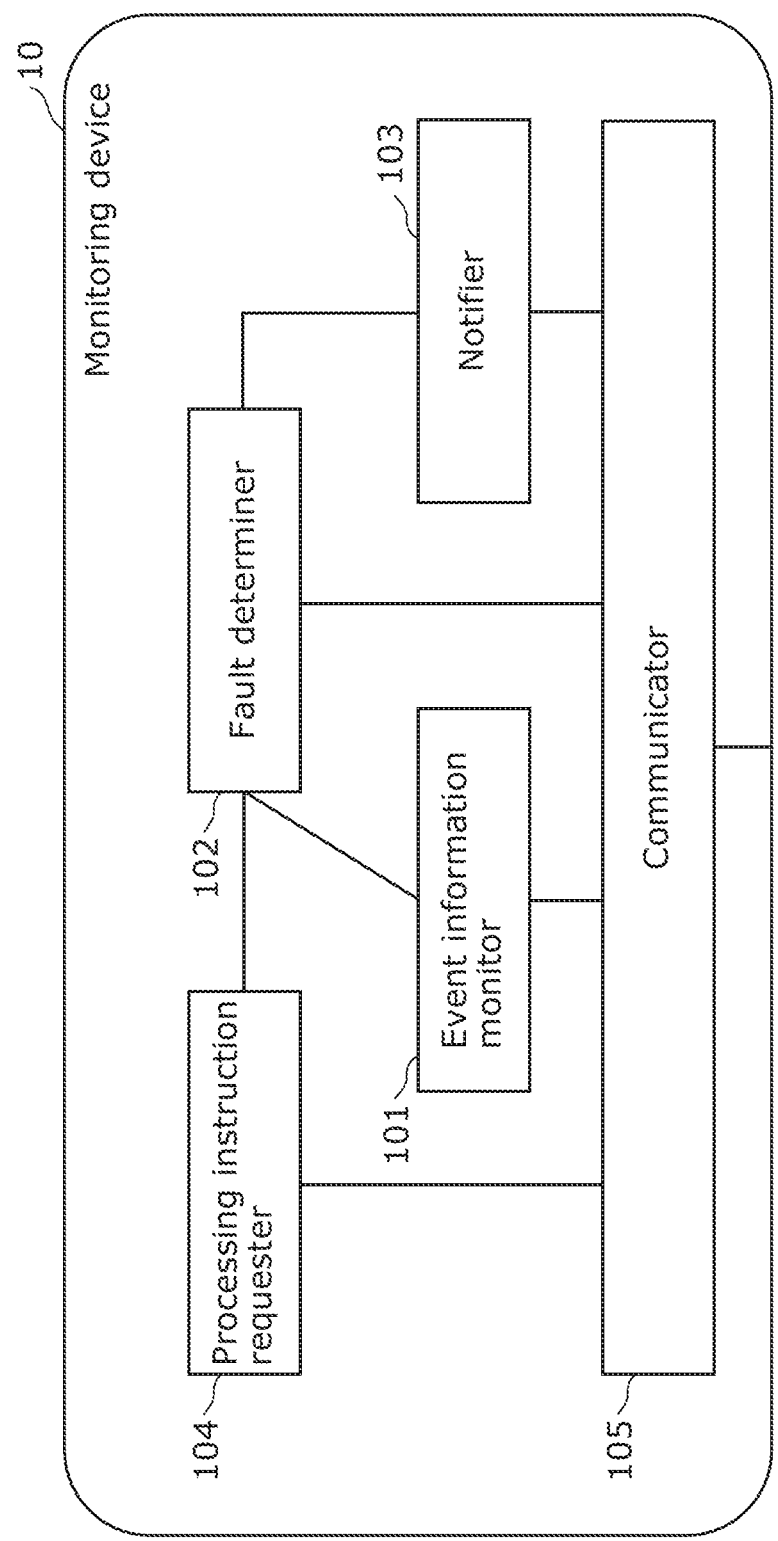
FIG. 7 is a diagram illustrating an example of the structure of a monitoring device according to the embodiment.

FIG. 7 is a diagram illustrating an example of the structure of monitoring device 10 according to this embodiment. Monitoring device 10 includes event information monitor 101, fault determiner 102, notifier 103, processing instruction requester 104, and communicator 105, and monitors appliance 40. Monitoring device 10 is, for example, implemented in a computer including a processor, a memory, a communication interface, and the like.

[1.4.1 Event Information Monitor]

Event information monitor 101 makes an inquiry about event information or a transmission request for the event information to any of authentication servers 30a, 30b, and 30c, and obtains the event information. The event information subjected to the inquiry or the like by event information monitor 101 may be event information including all events issued in the past, or event information including only events issued since an inquiry or the like was made last time.

After obtaining the event information, event information monitor 101 requests fault determiner 102 to determine whether an object appliance of a processing instruction included in each unexecuted event is faulty. Here, event information monitor 101 transmits the unexecuted event to fault determiner 102.

[1.4.2 Fault Determiner]

Fault determiner 102 obtains, from appliance 40, state information indicating whether the appliance is faulty. In this embodiment, fault determiner 102 determines whether the event information received from event information monitor 101 includes a processing instruction to appliance 40 monitored by monitoring device 10. In the case where the event information includes a processing instruction to appliance 40, fault determiner 102 determines whether appliance 40 is faulty. To determine whether appliance 40 is faulty, fault determiner 102 obtains the state information from appliance 40. Fault determiner 102 determines whether appliance 40 is faulty, from the obtained state information. The method of determining whether appliance 40 is faulty is not limited. For example, a method of transmitting a message to appliance 40 and determining whether appliance 40 is faulty depending on whether a reply is received may be used. Other methods may be used for the determination.

Fault determiner 102 transmits the obtained state information to notifier 103.

[1.4.3 Notifier]

Notifier 103 receives the state information of appliance 40 from fault determiner 102, generates transaction data including the obtained state information, and transmits the transaction data to at least one authentication server 30. Here, notifier 103 may generate the transaction data including the state information, only in the case where fault determiner 102 determines that appliance 40 is faulty from the state information. In this embodiment, in the case where fault determiner 102 determines that appliance 40 is faulty, notifier 103 generates transaction data including the state information, and transmits the transaction data to authentication servers 30a, 30b, and 30c. Notifier 103 may generate the transaction data including the state information and transmit the transaction data to authentication servers 30a, 30b, and 30c, even in the case where fault determiner 102 determines that appliance 40 is not faulty.

Examples of transaction data generated by notifier 103 will be described below, with reference to FIG. 8 and FIG. 9.

Figures 8, 9, 10:
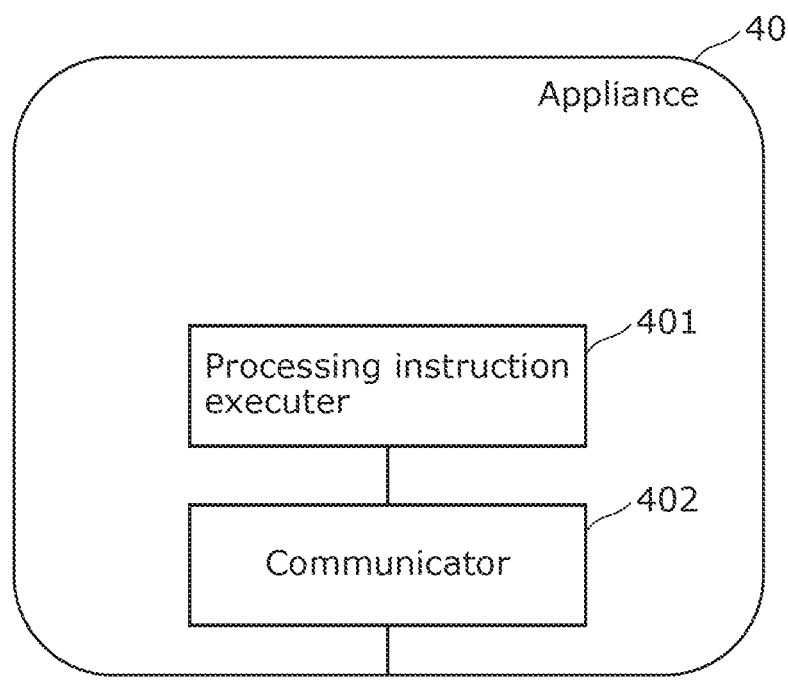
FIG. 8 is a diagram illustrating an example of transaction data generated by a notifier according to the embodiment.
FIG. 9 is a diagram illustrating an example of transaction data generated by the notifier according to the embodiment.
FIG. 10 is a diagram illustrating an example of the structure of an appliance according to the embodiment.

FIG. 8 and FIG. 9 are each a diagram illustrating an example of transaction data generated by notifier 103 according to this embodiment. FIG. 8 illustrates transaction data including state information and indicating that the determination date and time is 2019 Dec. 1 17:30, the object appliance is lighting 1, and the fault status is faulty. FIG. 9 illustrates transaction data including state information and indicating that the determination date and time is 2019 Dec. 1 17:30, the object appliance is lighting 1, and the fault status is normal.

[1.4.4 Processing Instruction Requester]

Processing instruction requester 104 transmits the processing instruction included in the event information to appliance 40, in the case where fault determiner 102 determines that appliance 40 is not faulty from the obtained state information. In this embodiment, in the case where fault determiner 102 determines that appliance 40 is not faulty from the state information, processing instruction requester 104 requests appliance 40 to execute the processing instruction included in the event information received from fault determiner 102.

[1.4.5 Communicator]

Communicator 105 communicates with authentication servers 30a, 30b, and 30c and appliance 40 via the network. In this embodiment, communicator 105 transmits a message inquiring about the event information or requesting transmission of the event information to authentication servers 30a, 30b, and 30c, and receives the event information as a reply. Communicator 105 transmits the transaction data generated by notifier 103, to authentication servers 30a, 30b, and 30c. Communicator 305 transmits the processing instruction to appliance 40, and requests appliance 40 to execute the processing instruction.

Thus, monitoring device 10 obtains the state information of whether appliance 40 is faulty, based on the obtained event information. In the case where appliance 40 operates normally, monitoring device 10 requests appliance 40 to execute the processing instruction included in the event information. In the case where appliance 40 is faulty, monitoring device 10 transmits the transaction data including the state information to authentication servers 30a, 30b, and 30c, to register the state information in the distributed ledger. Monitoring device 10 may transmit the transaction data including the state information to authentication servers 30a, 30b, and 30c to register the state information in the distributed ledger, even in the case where appliance 40 operates normally.

[1.5 Appliance]

Appliance 40 will be described below. For example, appliance 40 may be an air conditioner, a locker, a delivery locker, an e-bike, an e-bicycle, or a coin-operated laundry, or an electronic lock attached to any of these.

FIG. 10 is a diagram illustrating an example of the structure of appliance 40 according to this embodiment. Appliance 40 according to this embodiment includes processing instruction executer 401 and communicator 402.

[1.5.1 Processing Instruction Executer]

Processing instruction executer 401 executes the processing instruction transmitted from monitoring device 10.

[1.5.2 Communicator]

Communicator 402 communicates with monitoring device 10 via the network. In this embodiment, communicator 402 receives the processing instruction from monitoring device 10, and transmits the processing instruction to processing instruction executer 401.

Thus, appliance 40 receives the processing instruction from monitoring device 10, and executes the process.

[2. Operation]

A fault monitoring method by monitoring device 10 in the fault monitoring system having the above-described structure will be described below, using a flowchart.

Figure 11:
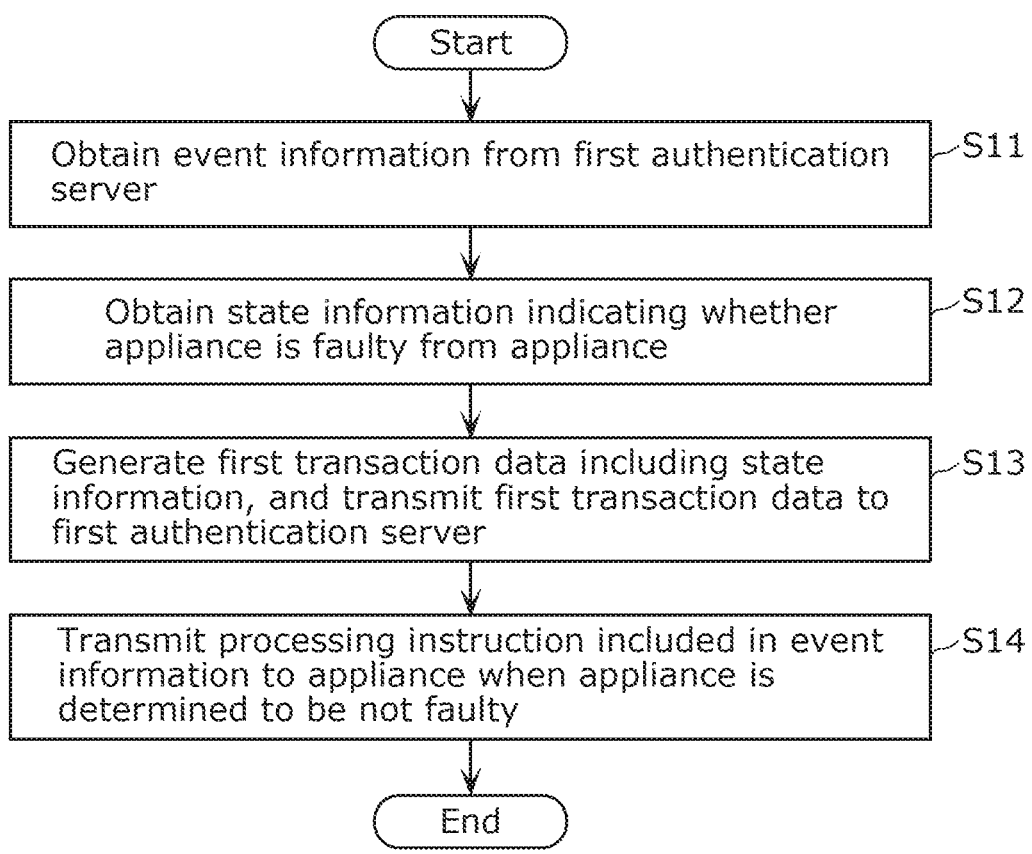
FIG. 11 is a flowchart illustrating a fault monitoring method according to the embodiment.

FIG. 11 is a flowchart illustrating the fault monitoring method according to this embodiment.

As illustrated in FIG. 11, first, monitoring device 10 obtains event information stored in the plurality of authentication servers 30, from the first authentication server (S11). The event information includes an event generated in response to a request that is generated by the user via terminal 20 and transmitted from terminal to the first authentication server among the plurality of authentication servers 30 and includes a processing instruction for the user operating appliance 40, as mentioned above.

Next, monitoring device 10 obtains, from appliance 40, state information indicating whether the appliance is faulty (S12).

Next, monitoring device 10 generates first transaction data including the state information obtained in Step S12, and transmits the first transaction data to the first authentication server (S13). In this way, the first transaction data can be recorded in the distributed ledger in each of the plurality of authentication servers 30.

Next, in the case where monitoring device 10 determines that appliance 40 is not faulty from the state information obtained in Step S12, monitoring device 10 transmits the processing instruction included in the event information to appliance 40 (S14).

Operation in the fault monitoring system having the above-described structure will be described below, using sequence diagrams. Operation in the fault monitoring system will be described separately in two phases, i.e. user request transmission operation and fault monitoring operation.

[2.1 User Request Transmission Operation]

The user request transmission operation in the fault monitoring system will be described below.

Figure 12:
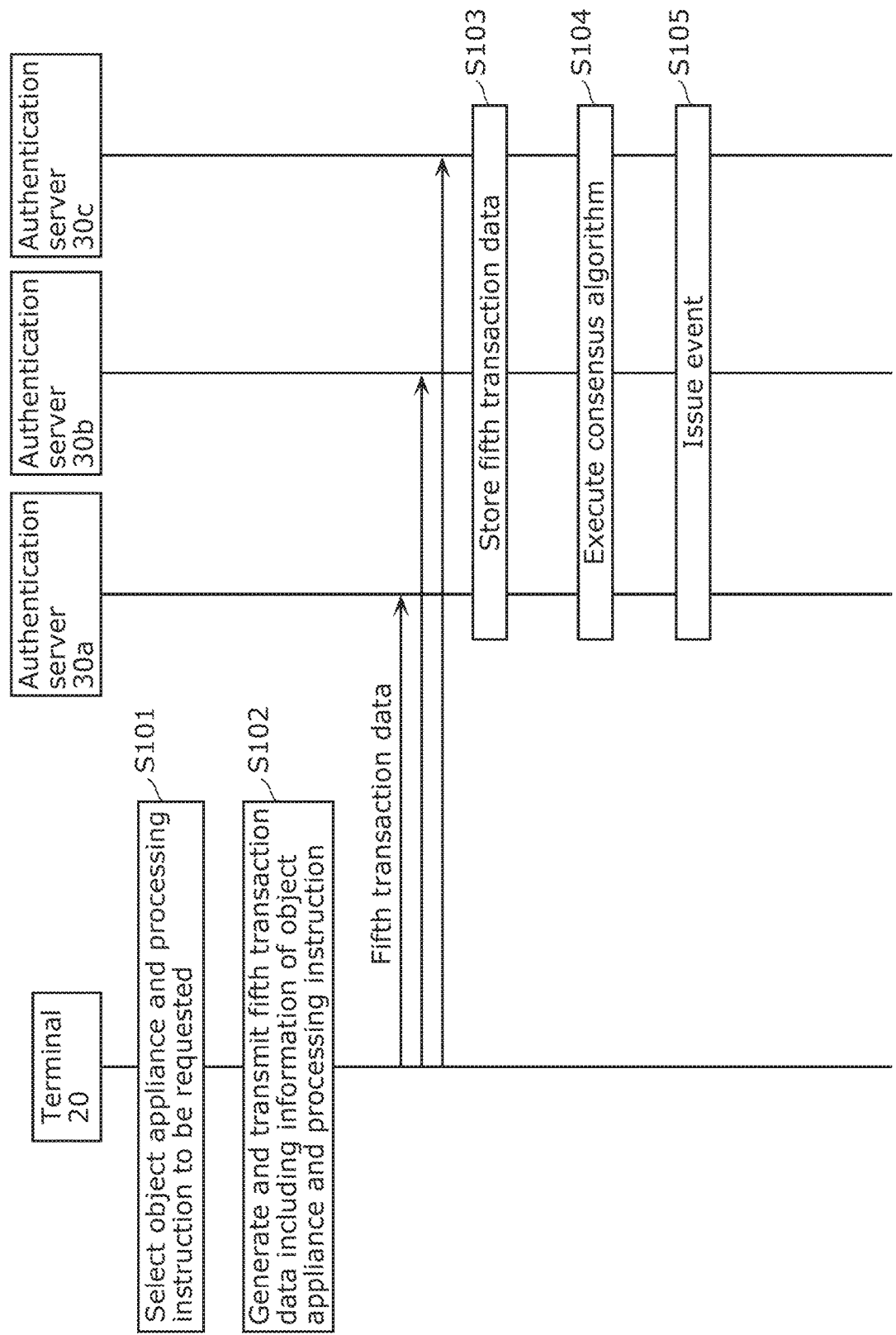
FIG. 12 is a sequence diagram illustrating an example of a user request transmission operation in the fault monitoring system according to the embodiment.

FIG. 12 is a sequence diagram illustrating an example of the user request transmission operation in the fault monitoring system according to this embodiment.

First, terminal 20 receives input from the user, and selects an appliance of an operation object (object appliance in the drawing) and a processing instruction to the appliance (S101).

Next, terminal 20 generates transaction data (hereafter referred to as "fifth transaction data") including information of the appliance and the processing instruction selected in Step S101, and transmits the fifth transaction data (S102). The fifth transaction data may include not only the processing instruction but also the information of the object appliance, the generation date and time of the transaction data, or the user's signature. In the example illustrated in FIG. 12, terminal 20 transmits the generated fifth transaction data to authentication servers 30a, 30b, and 30c. Alternatively, terminal 20 may transmit the generated fifth transaction data only to any of authentication servers 30a, 30b, and 30c. In this case, the authentication server to which the fifth transaction data has been transmitted transfers the fifth transaction data to the other authentication servers.

Next, authentication servers 30a, 30b, and 30c each receive the fifth transaction data transmitted in Step S101, and stores the fifth transaction data in transaction data storage 301 (S103).

Next, authentication servers 30a, 30b, and 30c execute a consensus algorithm (S104). In more detail, authentication servers 30a, 30b, and 30c first read the fifth transaction data stored in transaction data storage 301, and verify the validity of the fifth transaction data. For example, the validity is verified by determining the consistency of the processing instruction, the issuance date and time, the name, and the like included in the fifth transaction data. Each of authentication servers 30a, 30b, and 30c, having verified the validity of the received fifth transaction data, generates a block including the fifth transaction data. Each of authentication servers 30a, 30b, and 30c then records the block including the fifth transaction data in the region functioning as the distributed ledger in transaction data storage 301. In this way, the fifth transaction data indicating the request including the processing instruction is recorded in the distributed ledger, i.e. the blockchain.

Next, authentication servers 30a, 30b, and 30c issue an event relating to the fifth transaction data (S105). The event relating to the fifth transaction data is an event generated in response to the request including the processing instruction for the user operating the appliance as mentioned above, and includes, for example, the issuance date and time and the fifth transaction data.

[2.2 Fault Monitoring Operation]

The fault monitoring operation in the fault monitoring system will be described below.

Figure 13:
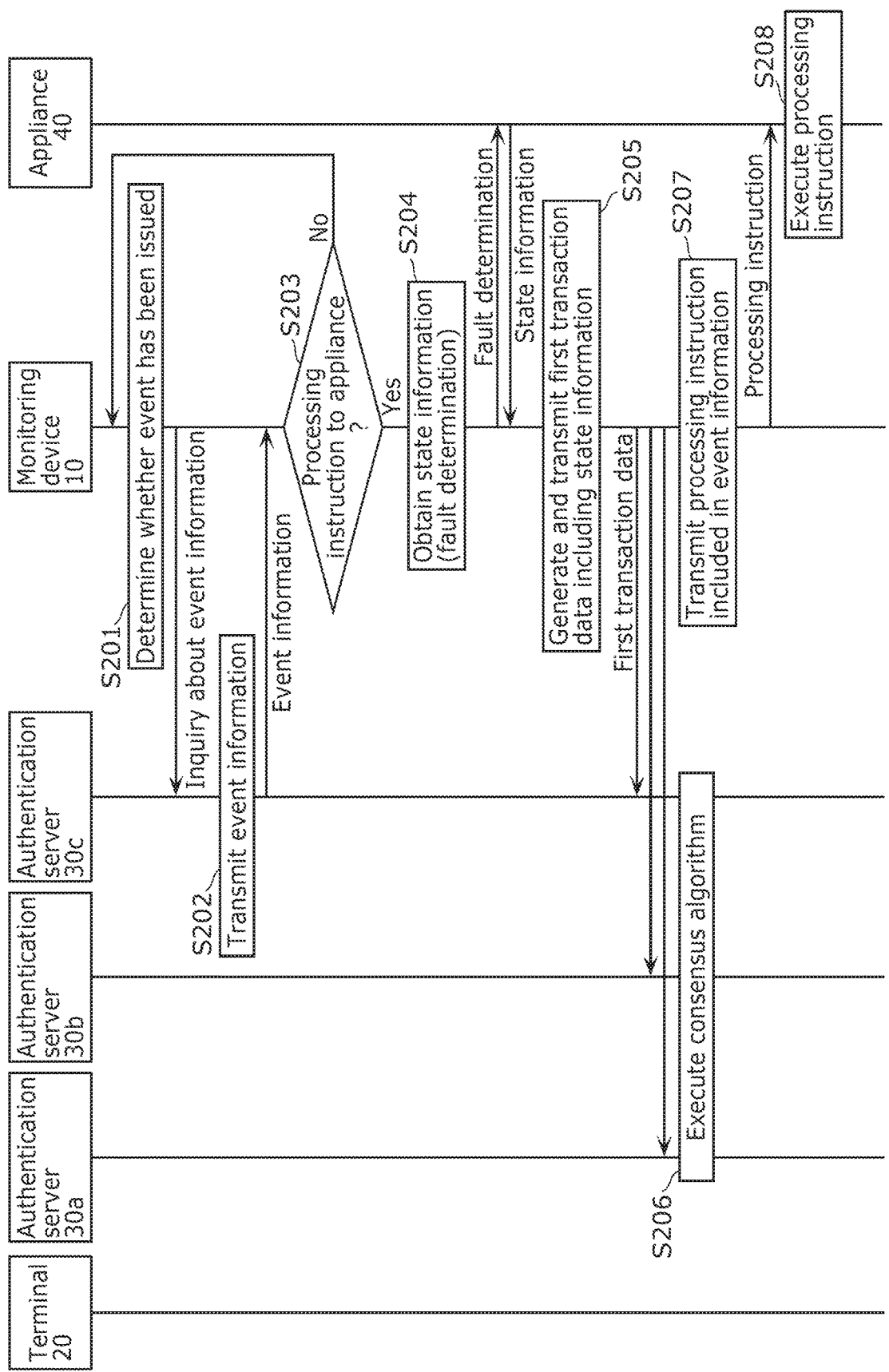
FIG. 13 is a sequence diagram illustrating an example of a fault monitoring operation in the fault monitoring system according to the embodiment.

FIG. 13 is a sequence diagram illustrating an example of the fault monitoring operation in the fault monitoring system according to this embodiment.

First, monitoring device 10 determines whether an event has been issued to one authentication server (authentication server 30c in the drawing) among authentication servers 30a, 30b, and 30c (S201). In this embodiment, monitoring device 10 inquires of authentication server 30c about the event information.

Next, authentication server 30c, having received the inquiry, transmits the event information stored in event information storage 304 to monitoring device 10 as a reply (S202).

Next, monitoring device 10 determines whether the obtained event information includes a processing instruction to appliance 40 monitored by monitoring device 10 (S203). In the case where the obtained event information does not include a processing instruction to appliance 40 in Step S203 (S203: No), monitoring device 10 returns to Step S201.

In the case where the obtained event information includes a processing instruction to appliance 40 in Step S203 (S203: Yes), monitoring device 10 obtains state information of appliance 40 (S204). For example, the state information may be obtained by a method of transmitting a message to appliance 40 and determining whether appliance 40 is faulty depending on whether a reply is received to thus obtain the state information indicating whether the appliance is faulty.

Next, monitoring device 10 generates transaction data (hereafter referred to as "first transaction data") including the state information obtained in Step S204, and transmits the transaction data to authentication servers 30a, 30b, and 30c (S205). Monitoring device 10 may transmit the generated first transaction data only to any of authentication servers 30a, 30b, and 30c. In this case, the authentication server to which the first transaction data has been transmitted transfers the first transaction data to the other authentication servers.

Next, authentication servers 30a, 30b, and 30c each receive the first transaction data transmitted from monitoring device 10, stores the first transaction data in transaction data storage 301, and execute a consensus algorithm (S206). In more detail, authentication servers 30a, 30b, and 30c each read the first transaction data stored in transaction data storage 301, and verify the validity of the first transaction data. Each of authentication servers 30a, 30b, and 30c, having verified the validity of the received first transaction data, generates a block including the first transaction data. Each of authentication servers 30a, 30b, and 30c then records the block including the first transaction data in the region functioning as the distributed ledger in transaction data storage 301. In this way, the first transaction data including the state information is recorded in the distributed ledger, i.e. the blockchain.

In the case where appliance 40 is not faulty, monitoring device 10 transmits the processing instruction included in the event information to appliance 40 (S207).

Lastly, appliance 40 executes the received processing instruction (S208).

The order in which Steps S207 and S206 are performed is not limited.

[3. Effects, Etc.]

Thus, in the fault monitoring system according to this embodiment, to cause the object appliance to perform a process, the user causes terminal 20 to transmit the fifth transaction data including the processing instruction to authentication server 30. Authentication server 30 verifies the validity of the fifth transaction data received from terminal 20, and issues an event corresponding to the processing instruction in the case where the fifth transaction data is valid. Monitoring device 10 determines that the event has been issued, and obtains state information indicating whether appliance 40 as the object of the processing instruction by the user is faulty. In the case where monitoring device 10 determines that appliance 40 is faulty, monitoring device 10 transmits the first transaction data including the state information to authentication server 30, to register the state information in the distributed ledger. In the case where appliance 40 is not faulty, monitoring device 10 causes appliance 40 to execute the process requested by the user.

As described above, in the fault monitoring system according to this embodiment, whether the appliance to be operated by the user is faulty is monitored by the monitoring device, and state information indicating whether the appliance is faulty is managed on the distributed ledger, i.e. the blockchain. Thus, not only the state information of the appliance can be protected from tampering but also the use of a faulty appliance can be suppressed. That is, the fault monitoring system according to this embodiment can suppress use of a faulty appliance using the distributed ledger.

Moreover, since the appliance that can be operated using the blockchain can be regarded as an appliance that is actually usable, it is possible to avoid a situation in which whether the appliance is actually usable is unknown until the user moves to the position of the appliance. Hence, the time and energy spent on moving to the position of the appliance that is faulty and cannot be operated are saved without being wasted. In addition, the reliability of the service using the blockchain can be ensured.

Example 1

In the case of operating an appliance on a blockchain, the authority over the appliance is managed on the blockchain. For example, in the case where the appliance is an electronic lock installed in a hotel room, the authority for locking and unlocking the electronic lock is managed on the blockchain, to manage entering and leaving the room using the blockchain.

Example 1 describes the case where, after determining that the appliance of the operation object is not faulty, the authority over the appliance is transferred on the blockchain. In this case, in the fifth transaction data generated by terminal 20, the request including the processing instruction for the user operating appliance 40 includes a transfer request for the authority over appliance 40 for causing appliance 40 to execute a processing instruction. Hence, the event information includes information indicating that the transfer request for the authority over appliance 40 has been made.

Fault monitoring operation according to Example 1 will be described below, with reference to FIG. 14.

Figure 14:
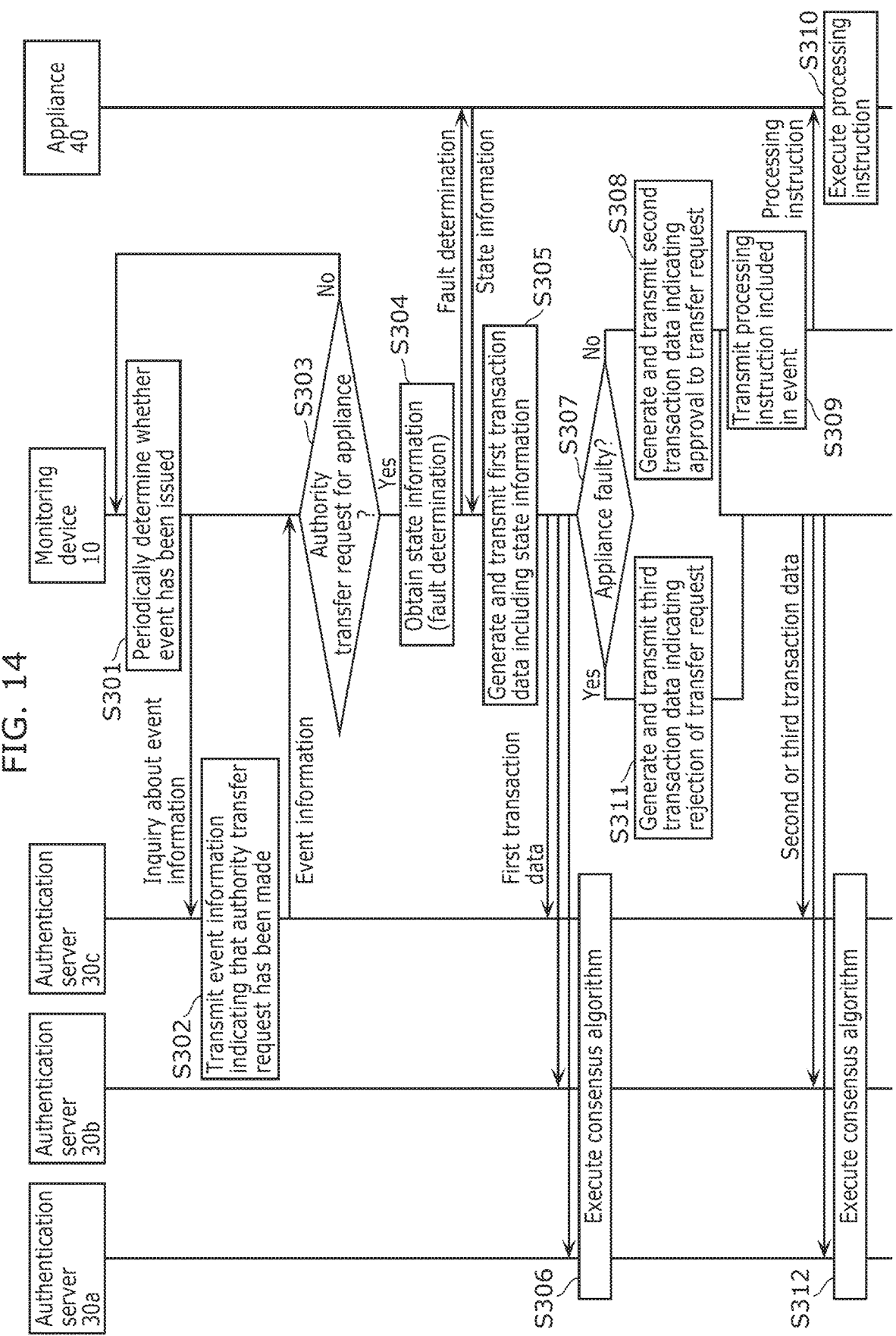
FIG. 14 is a sequence diagram illustrating an example of a fault monitoring operation in a fault monitoring system according to Example 1 of the embodiment.

FIG. 14 is a sequence diagram illustrating an example of the fault monitoring operation in the fault monitoring system according to Example 1 of this embodiment.

First, monitoring device 10 determines whether an event has been issued to one authentication server (authentication server 30c in the drawing) among authentication servers 30a, 30b, and 30c (S301). In this example, too, monitoring device 10 inquires of authentication server 30c about the event information.

Next, authentication server 30c, having received the inquiry, transmits the event information stored in event information storage 304 to monitoring device 10 as a reply (S302). In this example, the event information also includes information indicating that the transfer request for the authority over appliance 40 has been made.

Next, monitoring device 10 determines whether the obtained event information includes a transfer request for the authority over appliance 40 monitored by monitoring device 10 (S303). In the case where the obtained event information does not include a transfer request for the authority over appliance 40 in Step S303 (S303: No), monitoring device 10 returns to Step S301.

In the case where the obtained event information includes a transfer request for the authority over appliance 40 in Step S303 (S303: Yes), monitoring device 10 obtains state information of appliance 40 (S304). The method of obtaining the state information has been described above in relation to Step S204, and accordingly its description is omitted.

Next, monitoring device 10 generates first transaction data including the state information obtained in Step S304, and transmits the first transaction data to authentication servers 30a, 30b, and 30c (S305).

Next, authentication servers 30a, 30b, and 30c each receive the first transaction data transmitted from monitoring device 10, stores the first transaction data in transaction data storage 301, and execute a consensus algorithm (S306). This has been described in detail in relation to Step S206, and accordingly its description is omitted. As a result of executing the consensus algorithm, the first transaction data including the state information is recorded in the distributed ledger, i.e. the blockchain.

Monitoring device 10 also determines whether appliance 40 is faulty, from the state information (S307).

In the case where monitoring device 10 determines that appliance 40 is not faulty from the obtained state information in Step S307 (S307: No), monitoring device 10 generates transaction data (hereafter referred to as "second transaction data") indicating approval to the transfer request for the authority over appliance 40, and transmits the second transaction data to authentication servers 30a, 30b, and 30c (S308).

Next, monitoring device 10 transmits the processing instruction to appliance 40 included in the event information, to appliance 40 (S309).

Next, appliance 40 executes the received processing instruction (S310).

In the case where monitoring device 10 determines that appliance 40 is faulty from the obtained state information in Step S307 (S307: Yes), monitoring device 10 generates transaction data (hereafter referred to as "third transaction data") indicating rejection of the transfer request for the authority over appliance 40, and transmits the third transaction data to authentication servers 30a, 30b, and 30c (S311).

Next, authentication servers 30a, 30b, and 30c each receive the second or third transaction data transmitted from monitoring device 10, stores the second or third transaction data in transaction data storage 301, and executes a consensus algorithm (S312). In more detail, authentication servers 30a, 30b, and 30c each read the second or third transaction data stored in transaction data storage 301, and verify the validity of the second or third transaction data. Each of authentication servers 30a, 30b, and 30c, having verified the validity of the received second or third transaction data, generates a block including the second or third transaction data. Each of authentication servers 30a, 30b, and 30c then records the block including the second or third transaction data in the region functioning as the distributed ledger in transaction data storage 301. In this way, the second or third transaction data is recorded in the distributed ledger, i.e. the blockchain.

The order in which Steps S310 and S312 are performed is not limited. Moreover, Step S312 is optional.

Example 2

Example 2 describes the case where, before determining the state information of the appliance of the operation object, the authority over the appliance is transferred on the blockchain, and the authority is returned in the case where the appliance is faulty. In this case, in the fifth transaction data generated by terminal 20, the request including the processing instruction for the user operating appliance 40 includes transfer of the authority over appliance 40 for causing appliance 40 to execute a processing instruction. Hence, the event information includes information indicating that the transfer of the authority over appliance 40 has been made.

Fault monitoring operation according to Example 2 will be described below, with reference to FIG. 15.

Figure 15:
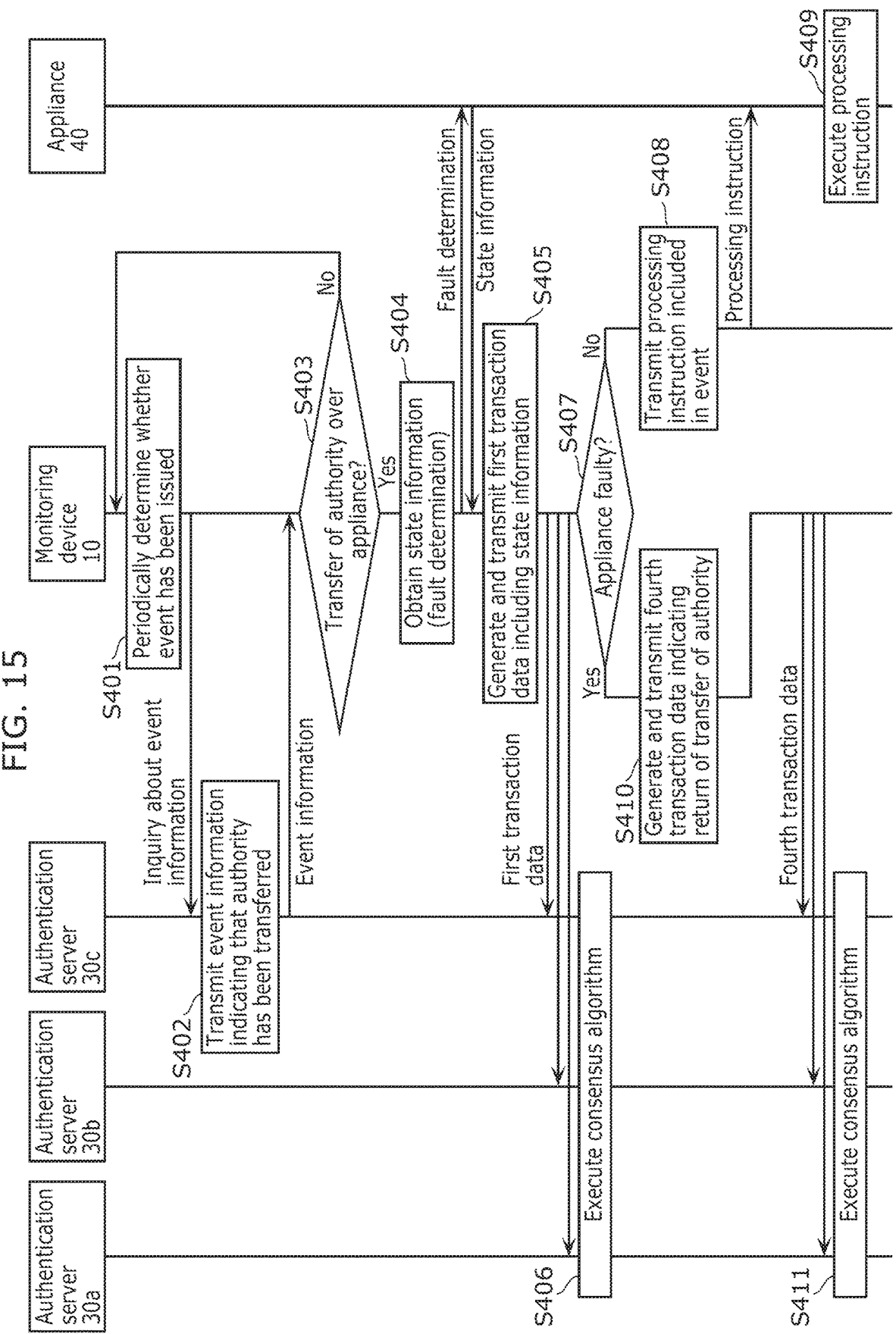
FIG. 15 is a sequence diagram illustrating an example of a fault monitoring operation in a fault monitoring system according to Example 2 of the embodiment.

FIG. 15 is a sequence diagram illustrating an example of the fault monitoring operation in the fault monitoring system according to Example 2 of this embodiment.

First, monitoring device 10 determines whether an event has been issued to one authentication server (authentication server 30c in the drawing) among authentication servers 30a, 30b, and 30c (S401). In this example, too, monitoring device 10 inquires of authentication server 30c about the event information.

Next, authentication server 30c, having received the inquiry, transmits the event information stored in event information storage 304 to monitoring device 10 as a reply (S402). In this example, the event information also includes information indicating that the transfer of the authority over appliance 40 has been made.

Next, monitoring device 10 determines whether the obtained event information indicates the transfer of the authority over appliance 40 monitored by monitoring device 10 (S403). In the case where the obtained event information does not indicate the transfer of the authority over appliance 40 in Step S403 (S403: No), monitoring device 10 returns to Step S401.

In the case where the obtained event information indicates the transfer of the authority over appliance 40 in Step S403 (S403: Yes), monitoring device 10 obtains state information of appliance 40 (S404). The method of obtaining the state information has been described above in relation to Step S204, and accordingly its description is omitted.

Next, monitoring device 10 generates first transaction data including the state information obtained in Step S404, and transmits the first transaction data to authentication servers 30a, 30b, and 30c (S405).

Next, authentication servers 30a, 30b, and 30c each receive the first transaction data transmitted from monitoring device 10, stores the first transaction data in transaction data storage 301, and execute a consensus algorithm (S406). This has been described in detail in relation to Step S206, and accordingly its description is omitted. As a result of executing the consensus algorithm, the first transaction data including the state information is recorded in the distributed ledger, i.e. the blockchain.

Monitoring device 10 also determines whether appliance 40 is faulty, from the state information (S407).

In the case where monitoring device 10 determines that appliance 40 is not faulty from the obtained state information in Step S407 (S407: No), monitoring device 10 transmits the processing instruction to appliance 40 included in the event information, to appliance 40 (S408).

Next, appliance 40 executes the received processing instruction (S409).

In the case where monitoring device 10 determines that appliance 40 is faulty from the obtained state information in Step S407 (S407: Yes), monitoring device 10 generates transaction data (hereafter referred to as "fourth transaction data") indicating return of the transfer of the authority over appliance 40, and transmits the fourth transaction data to authentication servers 30a, 30b, and 30c (S410).

Next, authentication servers 30a, 30b, and 30c each receive the fourth transaction data transmitted from monitoring device 10, stores the fourth transaction data in transaction data storage 301, and executes a consensus algorithm (S411). In more detail, authentication servers 30a, 30b, and 30c each read the fourth transaction data stored in transaction data storage 301, and verify the validity of the fourth transaction data. Each of authentication servers 30a, 30b, and 30c, having verified the validity of the received fourth transaction data, generates a block including the fourth transaction data. Each of authentication servers 30a, 30b, and 30c then records the block including the fourth transaction data in the region functioning as the distributed ledger in transaction data storage 301. In this way, the fourth transaction data is recorded in the distributed ledger, i.e. the blockchain.

The order in which Steps S409 and S411 are performed is not limited.

(Other Embodiments)

While the fault monitoring system according to the present disclosure has been described above by way of an embodiment, the present disclosure is not limited to the foregoing embodiment. Various modifications to the embodiments conceived by a person skilled in the art and other embodiments formed by combining structural elements in the embodiments without departing from the gist of the present disclosure are also included in the scope of the present disclosure. For example, the following cases are also included in the scope of the present disclosure.

(1) In the case where one monitoring device monitors a plurality of appliances, when obtaining state information, the monitoring device may obtain only state information of an appliance subjected to a newly issued event indicated in obtained event information. Alternatively, when obtaining state information, the monitoring device may obtain not only state information of an appliance subjected to a newly issued event indicated in obtained event information but state information of all appliances monitored by the monitoring device.

(2) In the foregoing embodiment, when a new event is issued in authentication server 30 in the fault monitoring system according to the present disclosure, the monitoring device obtains the state information of the appliance and determines whether the appliance is faulty before requesting the appliance to execute the processing instruction. However, the presently disclosed technique is not limited to such. When a new event is issued in authentication server 30, the monitoring device may request the appliance to execute the processing instruction, and obtain the state information from the execution result transmitted from the appliance. For example, suppose the appliance is a locker equipped with a sensor for detecting opening of the door. In this case, if the monitoring device cannot detect opening of the door despite an instruction to open the door being transmitted to the locker, the monitoring device may obtain state information indicating that the locker is faulty by determining that the locker is faulty.

(3) Each of the foregoing devices is specifically a computer system including a microprocessor, ROM, RAM, a hard disk unit, a display unit, a keyboard, a mouse, or the like. A computer program is stored in the RAM or hard disk unit. The device achieves its functions by the microprocessor operating according to the computer program. The computer program is configured by combining multiple command codes indicating instructions to the computer, to achieve predetermined functions.

(4) Part or all of the structural elements constituting each of the foregoing devices may be configured as a single system large scale integration (LSI). A system LSI is a super-multifunctional LSI manufactured integrating multiple components on a single chip, and specifically is a computer system including a microprocessor, ROM, RAM, and so forth. A computer program is stored in the RAM. The system LSI achieves its functions by the microprocessor operating according to the computer program.

(5) Part or all of the structural elements constituting each of the foregoing devices may be configured as an IC card detachably mountable to the device or a standalone module. The IC card or module is a computer system including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(6) The present disclosure may be the above-described methods, or may be a computer program which realizes these methods by a computer, or may be digital signals made up of the computer program.

(7) The present disclosure may be the computer program or the digital signals recorded in a computer-readable recording medium, such as flexible disk, hard disk, CD-ROM, MO, DVD, DVD-ROM, DVD-RAM, Blu-ray® disc (BD), or semiconductor memory. The present disclosure may also be the digital signals recorded in these recording mediums.

The present disclosure may be an arrangement where the computer program or the digital signals are transmitted over an electric communication line, a wireless or wired communication line, a network such as the Internet, data broadcasting, or the like.

The present disclosure may be a computer system having a microprocessor and memory, where the memory stores the computer program, and the microprocessor operates according to the computer program.

The present disclosure may also be carried out by another independent computer system, by the program or digital signals being recorded in the recording medium and being transported, or by the program or digital signals being transferred over the network or the like.

INDUSTRIAL APPLICABILITY

The presently disclosed technique can be used in, for example, a system in which a monitoring device independent of an appliance monitors whether the appliance is faulty, and the status indicating whether the appliance is faulty is managed in a blockchain.

The invention claimed is:

1. A fault monitoring method executed by a monitoring device in a fault monitoring system which includes a terminal used by a user, an appliance to be operated by the user, the monitoring device, and a plurality of authentication servers each including a distributed ledger and in which the terminal, the monitoring device, and the plurality of authentication servers are capable of communicating with one another via a network, the fault monitoring method comprising:

obtaining, from a first authentication server among the plurality of authentication servers, event information stored in the plurality of authentication servers, the event information indicating an event generated in response to a request that is generated by the user via the terminal and transmitted from the terminal to the first authentication server and includes a processing instruction for the user operating the appliance;

obtaining state information indicating whether the appliance is faulty, from the appliance;

generating first transaction data including the state information obtained and transmitting the first transaction data to the first authentication server, to record the first transaction data in the distributed ledger in each of the plurality of authentication servers; and transmitting the processing instruction included in the event information to the appliance, when the appliance is determined to be not faulty from the state information.

2. The fault monitoring method according to claim 1, wherein the request further includes a transfer request to transfer authority over the appliance for causing the appliance to execute the processing instruction, the event information further includes information indicating that the transfer request to transfer the authority over the appliance has been made, and the fault monitoring method further comprises, after obtaining the state information:

generating second transaction data indicating approval to the transfer request and transmitting the second transaction data to the first authentication server, when the appliance is determined to be not faulty from the state information; and generating third transaction data indicating rejection of the transfer request and transmitting the third transaction data to the first authentication server, when the appliance is determined to be faulty from the state information.

3. The fault monitoring method according to claim 1, wherein the request further includes transfer of authority over the appliance for causing the appliance to execute the processing instruction, the event information further includes information indicating that the transfer of the authority over the appliance has been made, and the fault monitoring method further comprises, after obtaining the state information:

generating fourth transaction data indicating return of the transfer and transmitting the fourth transaction data to the first authentication server, when the appliance is determined to be faulty from the state information.

4. The fault monitoring method according to claim 1, comprising:

generating the first transaction data and recording a block including the first transaction data generated in the distributed ledger.

5. The fault monitoring method according to claim 1, comprising:

generating the first transaction data including the state information and recording the first transaction data generated in the distributed ledger, only when the appliance is determined to be faulty from the state information.

6. The fault monitoring method according to claim 1, further comprising:

recording fifth transaction data indicating the request including the processing instruction, in the distributed ledger in the first authentication server.

7. A monitoring device in a fault monitoring system which includes a terminal used by a user, an appliance to be operated by the user, the monitoring device, and a plurality of authentication servers each including a distributed ledger and in which the terminal, the monitoring device, and the plurality of authentication servers are capable of communicating with one another via a network, the monitoring device comprising:

an event information monitor that obtains, from a first authentication server among the plurality of authentication servers, event information stored in the plurality of authentication servers, the event information indicating an event generated in response to a request that is generated by the user via the terminal and transmitted from the terminal to the first authentication server and includes a processing instruction for the user operating the appliance;

a fault determiner that obtains state information indicating whether the appliance is faulty from the appliance, generates first transaction data including the state information obtained, and transmits the first transaction data to the first authentication server, to record the first transaction data in the distributed ledger in each of the plurality of authentication servers; and a processing instruction requester that transmits the processing instruction included in the event information to the appliance, when the appliance is determined to be not faulty from the state information.

8. A non-transitory computer-readable recording medium having a program recorded thereon for causing a computer to execute a fault monitoring method executed by a monitoring device in a fault monitoring system which includes a terminal used by a user, an appliance to be operated by the user, the monitoring device, and a plurality of authentication servers each including a distributed ledger and in which the terminal, the monitoring device, and the plurality of authentication servers are capable of communicating with one another via a network, the program causing the computer to:

obtain, from a first authentication server among the plurality of authentication servers, event information stored in the plurality of authentication servers, the event information indicating an event generated in response to a request that is generated by the user via the terminal and transmitted from the terminal to the first authentication server and includes a processing instruction for the user operating the appliance;

obtain state information indicating whether the appliance is faulty, from the appliance;

generate first transaction data including the state information obtained and transmit the first transaction data to the first authentication server, to record the first transaction data in the distributed ledger in each of the plurality of authentication servers; and transmit the processing instruction included in the event information to the appliance, when the appliance is determined to be not faulty from the state information.

* * * * *